Jan. 23, 1962    R. P. BROWN    3,017,858
BIRD NESTING AND SHELTERING DEVICE
Filed June 8, 1960
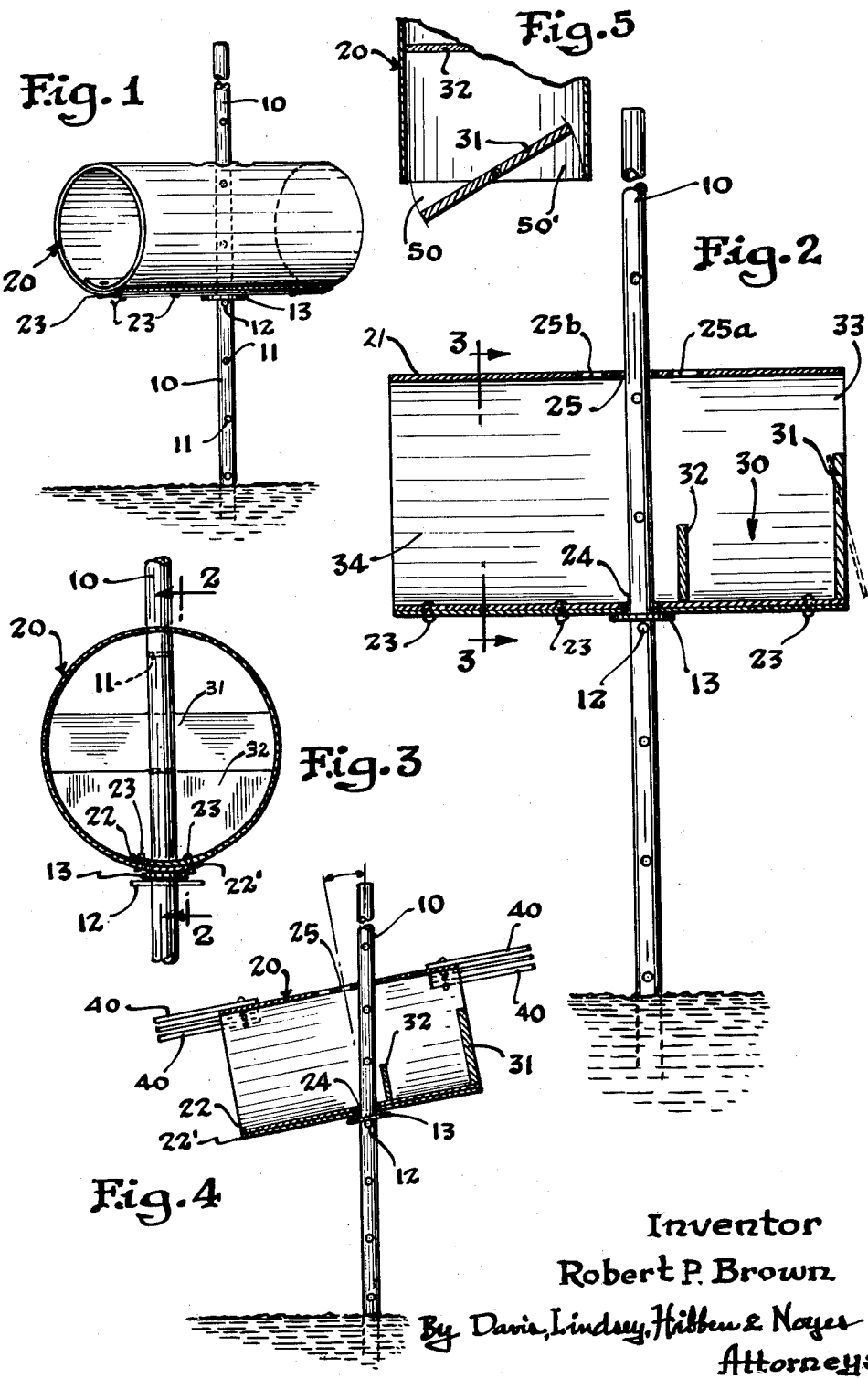
Inventor
Robert P. Brown
By Davis, Lindsey, Hibben & Noyes
Attorneys

United States Patent Office 3,017,858
Patented Jan. 23, 1962

3,017,858
BIRD NESTING AND SHELTERING DEVICE
Robert P. Brown, Rte. 1, Box 134, Wadsworth, Ill.
Filed June 8, 1960, Ser. No. 34,696
13 Claims. (Cl. 119—23)

The present invention relates generally to a sheltering device for birds and more particularly to an improved nesting and sheltering device for wild fowl and game birds which are normally subject to attack by predators or destruction by other natural elements and human instrumentalities.

It is recognized by conservationists and sportsmen that among the important reasons for the difficulty in increasing the population density of water fowl and game birds are the extremely large number of nests which are destroyed by predators during nesting periods, and the large number of birds which are killed by predators during the brooding period.

Most game birds and water fowl, such as Mallard ducks, begin laying eggs in April and lay an average of about ten eggs in a clutch during a period of two weeks. Broods begin hatching in late May or early June, for the fortunate birds that succeed in incubating without having the nests destroyed. The majority of birds, however, are not so fortunate. Nesting studies by conservationists have revealed that nesting losses are extremely high and are rarely under 60% and sometimes are as high as 80%. In some instances certain losses are caused by farm machinery but the remainder of the nests are usually robbed by predators. Only a few nests are flooded, destroyed by fire, or deserted by the birds. With water fowl, the nesting losses are almost always due to predators.

The birds whose nests are ruined in the early spring almost always build a second nest. In certain species, such as Mallard ducks and pheasants, a second or third loss of a nest will not prevent another attempt. However, the longer it takes to hatch a clutch of eggs the smaller the brood. Toward the end of the nesting season, a clutch may contain only 5 or 6 eggs.

During the incubating period and as the eggs develop, the bird becomes very much attached to the nest. Toward the end of incubation period the bird will rarely desert the nest. Consequently, many of the birds are killed by predators or other causes during the incubation period. Thus, for example, one survey of Mallard ducks has shown that out of ten ducks which nested only six survived and the remaining four fell prey to some predator. Of the ducks which survive there was an average of only about six eggs per nest hatched at the end of the brooding period.

Since birds raised in captivity rarely have the ability to adapt themselves to wild life after liberation, they either succumb quickly to some predator or are unable to care for themselves and die. Ducks, for example, are particularly difficult to transfer successfully from artificial conditions to wild life and there is little likelihood of successfully stocking an area with ducks reared in captivity. It is therefore highly desirable that the wild birds be encouraged to produce offspring under natural conditions, rather than to attempt to stock an area with birds bred in captivity.

Heretofore attempts have been made to provide wild water fowl and game birds with protective nesting devices, but these devices have been unsuccessful either because the birds failed to use the devices or the devices failed to provide the necessary protection against the natural enemies or human agents of destruction.

It is therefore an object of the present invention to provide an improved nesting and sheltering device for birds which is substantially predator-proof.

It is a further object of the present invention to provide a nesting and sheltering device which is attractive to game birds and water fowl and which will be used by the birds for brooding purposes.

It is a still further object of the present invention to provide an improved nesting and sheltering device for water fowl and game birds which is inexpensive to manufacture and maintain.

It is also an object of the present invention to provide an improved bird nesting and sheltering device which can be readily adjusted for varying conditions and for accommodation of different species of birds.

Other objects of the invention wll be apparent to those skilled in the art from the accompanying detailed description when read in conjunction with the attached drawing wherein:

FIG. 1 is a perspective view of the nesting device of the present invention mounted on a support member surrounded by water;

FIG. 2 is a longitudinal vertical sectional view of FIG. 1;

FIG. 3 is a transverse vertical sectional view along the line 3—3 of FIG. 2;

FIG. 4 is a vertical longitudinal sectional view of the nesting device of FIG. 1 mounted in an alternate manner and having protective means mounted thereon; and FIG. 5 is a fragmentary horizontal sectional view of a modified form of the nesting device of the present invention.

In accordance with the present invention, it has been discovered that an improved bird nesting and sheltering device is produced by pivotally and vertically adjustably mounting a generally tubular housing section on a post or other support means which spaces the housing from the earth surface with the longitudinal axis of the housing extending generally horizontally and with both ends of the housing section having a passage of sufficient size to provide the bird with convenient access to the interior of the housing and a ready emergence therefrom.

It is essential that any suitable nesting device for water fowl or game birds be spaced well above ground level or the surface of water during the nesting period by means which a predator inhabiting the ground or water surrounding the nesting device cannot climb. The nest housing of the present invention is therefore supported by a small diameter post preferably of resistant metal which can be permanently positioned in the ground and on which the housing can be mounted in a plurality of vertical positions. Since the metal supporting post prevents predators reaching the interior of the nesting device, both the birds and the clutch of eggs concealed therein are safe during the brooding period. The height of the nest housing above the ground or water level can be varied and will depend on the particular species of bird and the nature of the surrounding area.

When the nesting device of the present invention is supported on a metal post or the like securely positioned so as to be completely surrounded by water, as when placed away from the shoreline of a body of water, the nesting device provides an ideal brooding place for water fowl such as Mallard ducks. In the event that the water level changes during the brooding period the housing section containing the nest can be moved vertically on the post to maintain the housing a constant distance above the water surface.

Since it has been found that water fowl, such as Mallard ducks, instinctively avoid nesting in a confined space which does not have an opening at both the front and back portion thereof, the nesting device of the present invention is provided with both an entrance opening and an emergency exit opening through which the duck can pass. If the nesting device is provided with only one opening, it has been found that Mallard ducks often refuse to nest therein.

It has also been discovered that water fowl, such as Mallard ducks, invariably enter the air by jumping into the wind. Thus, to make the nesting device acceptable and attractive to the ducks, the nest housing of the present invention is pivotally mounted so that the entrance opening thereof always faces downwind. The foregoing highly desirable result is achieved by pivotally mounting the housing section on the supporting post with the post passing through the vertical axial plane of the housing and entering the lower portion of the housing at a point closer to one end thereof than the other end. When the housing section is thus pivotally mounted on a supporting member, the housing section acts in the same manner as a weather vane and is rotated by the pressure of the air on the surfaces thereof so that the end which is farthest from the pivotal point remains in a downwind position. Thus, by providing the end of the housing section which is farthest from the the pivotal point free of all obstructions, an entrance opening is formed, which is at all times in a suitable position for the duck to enter by jumping into the wind.

In order to further increase the attractiveness of the nesting device to water fowl and game birds, the nest housing is provided on the upper surface thereof with a plurality of spaced passages adapted to selectively receive the upper end of the pivotal post so that the housing can be rotatively mounted on the post in a general horizontal position while at the same time permitting the longitudinal axis of the housing being disposed at an angle with a horizontal plane. By passing the post member through the most forwardly or most rearwardly spaced passage in the upper surface of the housing section, the entrance opening of the housing section can be tilted upwardly or downwardly, respectively. Mounting the housing section on the post member so that the housing section tilts downwardly toward the surface of the water, for example, enables the entrance opening to be positioned so that the water fowl can enter the nest more easily and at the same time the nesting area within the housing section is elevated a safe distance above water surface. And, by mounting the housing section in the foregoing manner, the pivotal movement of the housing in response to the passage of the air thereover is also improved.

In order to prevent predatory birds from entering the housing section by landing on the upper surface of the housing section, it is desirable to provide a plurality of axially extending members which project outwardly beyond the end of both the entrance and exit openings thereof. For example, a plurality of spaced members can be readily secured to the upper surface of the housing section so that the openings are protected against the direct entry of a predatory bird from the upper surface of the housing section. It will be particularly evident that when the housing section is mounted so as to tilt downwardly and is provided with the protective means extending axially over the entrance opening, it will particularly be difficult for any bird other than a water fowl to directly enter the housing section.

After the eggs have hatched and the hen has taken her young from the nest, the nest can be lowered and tilted to allow the hen and brood to reenter for shelter during rain storms, hours of darkness and off-feeding periods, thereby preventing loss due to wet and cold and predatory animals.

Referring now to the drawing, there is shown in FIGS. 1–3 one embodiment of the nesting device of the present invention which is particularly adapted for use by water fowl, such as Mallard ducks, and wherein a supporting post 10, preferably of a rust resistant metal or like material is fixedly mounted in the earth surface so that the post is completely surrounded by water. The post has pivotally mounted thereon, at a suitable distance above the water surface, an elongated tubular nest housing 20. The post 10 can, if desired, be permanently mounted in a concrete footing and is of sufficient height to permit mounting of the housing 20 at an optimum height above the water surface to accommodate a variety of species of birds and any variation in the water level which might be encountered. The post 10 is preferably provided with a plurality of longitudinally spaced transversely extending openings 11 therein which removably retains a cotter pin 12 or the equivalent removable securing means for coacting with a flat washer member 13 which is mountable over the post 10 and retained in a predetermined position on the post 10 by the pin 12.

The nest housing 20 comprises an elongated generally tubular section 21 which is conveniently formed by bending a rectangular piece of ⅛ inch marine plywood upon itself and joining the overlapping end sections 22, 22', by suitable fastener members 23. The circular lower passageway 24 is formed in the overlapping end sections 22, 22' at a point closer to one of the open ends of the housing section and freely receives therein the post 10. At a point in the upper wall of the tubular section 21 diametrically opposite the passageway 24 is formed an upper passageway 25 through which the upper end of the post 10 freely extends. One or more additional passageways 25a and 25b are spaced longitudinally from the passageway 25 on opposite sides thereof. It will be apparent that the housing section 20 is thus rotatably mounted on the post 10 by first positioning the cotter pin 12 in the desired opening 11 with the washer 13 resting on the pin 12. The nest housing 20 is then lowered over the post 10 passing through the passageways 24, 25, until the housing 20 is rotatably supported by the washer 13 and pin 12 which prevents any further downward movement thereof.

Within the cylindrical housing 20 a nesting area 30 is defined by retaining means which in the illustrated embodiment is comprised of spaced partition members 31 and 32. The partition member 31 is preferably formed of a segmental shaped section disposed in a vertical plane extending transversely of the housing 20 in the end thereof closest to the passageway 24. The partition member 31 partially closes the end of the housing 20 and preferably extends upwardly so as to close between about half and two-thirds of the distance between the lower and upper edges of the housing 20. In every instance, an exit passage 33 is formed in the said ends of the housing section through which a bird nesting therein can pass. The longitudinally spaced partition member 32 is disposed inwardly from the partition member 31 and is preferably mounted in the lower section thereof adjacent the post 10. If desired, the partition member 32 can be positioned on either side of the post 10. The partition member 32 is spaced from the entrance opening 34 of the housing section; so that there is no obstruction thereof. Together the partition members 31, 32 provide a nesting area adjacent the end of the housing 20 which is closest to the passageway 24.

The housing 20 can also be mounted on post 10 so that the unobstructed end thereof is tilted either downwardly or upwardly to provide a more convenient access to the particular species of birds which are to use the nesting device. Thus, the tubular section 21 can, if desired, be pivotally mounted on post 10 by having the upper end of the said post extend through passageway 25a, whereby the entrance opening 34 of the housing 20 is tilted forwardly with the nesting area 30 elevated above the passageway 24, as shown in FIG. 4 of the drawing. Similarly, if the post 10 passes through passageway 25b, the housing section 21 will tilt upwardly so that the entrance 34 is in an elevated position and may be more attractive to certain game birds.

It is also desireable in certain instances to provide the entrance opening 34 and the exit passage 33 of the housing 20 with a plurality of slats 40 which extend axially from the upper surface of the housing section a substantial distance so as to serve as protective canopy means. The slats 40, preferably six in number, extend outwardly from the housing 20 a distance of about 12 inches or more. If desired, several laths having a length sufficient to extend the entire length of the housing 20 and project outwardly over each end thereof the required distance can be used rather than two sets of short sections of slats. The extension laths or slats 40 serve to protect the nest by preventing certain predator birds landing on the upper surface of the housing 20 and then entering the nesting area.

In FIGURE 5 is illustrated a modified end structure for the housing 20 in which the end partition member 31 is mounted so that one or more passages are formed along the lateral surfaces and the bottom edge thereof. In the form illustrated the partition member 31 has the same segmental form as in FIGURE 1 but is disposed angularly with respect to the end opening 33 so that the partition 31 lies in a vertical plane forming an angle of less than 90° with the longitudinal axis and vertical axial plane of the housing section, thereby providing additional exit passages 50, 50' at the end of the housing 20. It is, of course, also possible to position the member 31 in the end opening 33 perpendicularly to the longitudinal axis but with the member 31 lying in a plane which forms an angle less than 90° with a horizontal plane, as by pivoting the member 31 about a transverse axis such as indicated by the dotted lines in FIGURE 2. It is particularly desirable to dispose the partition member 31 in the position shown in FIGURE 5 when the nest housing 20 is lowered and tilted so that the entrance opening 34 is adjacent the surface of the water. When in the lowered position the brood can conveniently reenter the nest housing for shelter against inclement weather and during darkness and off-feeding periods when protection against predators is desirable. The passages 50, 50' are used by the young brood as emergency exits in the event a predator enters the front opening 34, thereby permitting the escape of the young birds which otherwise might have difficulty escaping over the top of partition member 31 when a predator enters opening 34.

It will be understood that while the tubular nest housing illustrated in the drawing has a cylindrical form, it is also possible to form the tubular housing section in a form other than cylindrical, such as providing the housing section with angular sides rather than circular sides. Also, the housing section can be formed of suitable plastic material, or of metallic material which is processed to prevent overheating, as by providing perforations which ventilate and cool the housing, or by otherwise treating to prevent overheating both the bird and the eggs therein. It may also be desirable to place natural cover, such as straw or brush over the housing 20 to both insulate the housing and to provide the nesting device with a more natural appearance which will attract the birds.

When the nesting season has ended, or when it is desired to clean the nest housing 20, it is a very simple procedure to remove the nest housing 20 from the post 10 by lifting the tubular section 21 upward until the post 10 no longer is engaged in the passageways 24, 25. It is of course unnecessary to remove the post 10 from the earth. Since the housing section has no loose parts and is relatively unbreakable it is a simple matter to store the housing section 20 until the next nesting season arrives.

It will be apparent from the foregoing description that whereas the nesting device is adaptable for use by any land game bird, such as the pheasant, wild turkey or grouse, the nesting device of the present invention is particularly suited for use by water fowl, such as the Mallard duck which enters the nesting device from the surface of the water.

I claim:

1. A sheltering device for birds which comprises a generally tubular housing section having entrance openings at opposite longitudinal ends thereof, and having a retaining means within the said housing section adjacent one end thereof with the other end being free substantially of obstructions, said housing section being pivotally mounted on a support means adapted to space the said housing from the earth surface with the longitudinal axis of said housing section extending generally horizontally, and said housing section being rotatable by the pressure of air passing thereover so that said other end is maintained downwind.

2. A device as in claim 1, wherein said housing section is mounted on a support means comprising post member which is provided with means for adjustably supporting the said housing section at spaced vertical points thereon.

3. A device as in claim 1, wherein the said housing section is rotatably mounted with the longitudinal axis of the housing section disposed at an angle with a horizontal plane, whereby one of the entrance openings is elevated above the other said opening.

4. A device as in claim 1, wherein the housing section is provided along the upper surface thereof with protective means extending outwardly over the said openings thereof in a generally axial direction.

5. A sheltering device for use by birds which comprises a generally tubular housing section having openings at both ends through which a bird can pass and having spaced members within said housing section defining a sheltering compartment proximate one end of said housing with the other end remaining substantially unobstructed, a support means on which the said housing section is pivotally mounted, and said support means engaging said housing section at a point closer to the said end of the housing section having said compartment proximate thereto than to said other end, whereby said housing section is rotatable by the pressure of air moving thereover so that said other end remains downwind.

6. A bird nesting and sheltering device which comprises a generally tubular housing section having openings at both ends through which a bird can pass, spaced partition members within said housing section which provide a nesting area therebetween adjacent one end of said housing section with the other end being substantially free of obstructions, a supporting post member substantially vertically disposed for pivotally supporting said housing section thereon and said post member passing through said housing section intermediate the ends thereof in the vertical axial plane thereof and supportingly engaging the housing section at a point closer to said one end having the nesting area adjacent thereto than to said other end, whereby said housing section is rotatable by pressure of air thereon so that said other end thereof remains downwind.

7. A bird nesting and sheltering device as in claim 6 wherein said post member is provided with means for adjustably supporting the said housing section at spaced vertical points thereon.

8. A bird nesting and sheltering device as in claim 6 wherein the said housing section is rotatably mounted with the longitudinal axis of the housing section disposed at an angle with a horizontal plane, whereby one of the entrance openings is elevated above the other said opening.

9. A bird nesting and sheltering device as in claim 6 wherein the housing section is provided along the upper surface thereof with spaced protective means extending outwardly over the said openings thereof in a generally axial direction.

10. A bird nesting and sheltering device as in claim 6 wherein the housing section is cylindrical in form with at least one of said partition members having a segmental shape with a height sufficient to close approximately the lower half of said one end of the housing section, and another partition member spaced inwardly thereof and mounted adjacent the post member, whereby said nesting area formed between the said partition members is protected by at least one of said partition members.

11. A bird nesting and sheltering device as in claim 10 wherein said one partition member is disposed vertically in said one end with the plane thereof forming an angle less than 90° with the vertical axial plane of the housing section.

12. A bird nesting and sheltering device as in claim 10 wherein said one partition member is disposed in said one end perpendicular to the longitudinal axis of the housing section with the plane of said partition member forming an angle less than 90° with horizontal plane.

13. A bird nesting device which comprises a generally cylindrical housing section having openings at both ends for a bird to pass therethrough, a first segmental partition member mounted in one end of said housing section closing between about ½ and ⅔ of the opening of the said end, a second partition member spaced inwardly from said first partition member and defining therebetween a nesting area with the other end of said housing section being substantially free of obstructions, a post member substantially vertically disposed for pivotally supporting thereon said housing section at a plurality of vertically spaced points therealong, and said post member passing through said housing section in the vertical axial plan thereof and supportingly engaging the lower portion of said housing section at a point closer to the end of the said section having the said first partition member mounted therein than said other end, whereby the said other end of the housing section which is substantially free of obstruction is maintained by the pressure of air on the housing section in a downwind position.

References Cited in the file of this patent

UNITED STATES PATENTS

| | | |
|---|---|---|
| 175,606 | Hillman | Apr. 4, 1876 |
| 2,235,959 | Copeman | Mar. 25, 1941 |
| 2,392,532 | Hyde | Jan. 8, 1946 |
| 2,681,038 | Clark | June 15, 1954 |
| 2,691,361 | McAnly | Oct. 12, 1954 |
| 2,808,027 | Inghram | Oct. 1, 1957 |
| 2,951,312 | Engh | Sept. 6, 1960 |

OTHER REFERENCES

Farmers Bulletin No. 1456, June 16, 1934.